March 7, 1933. R. W. KUMLER 1,900,506
PROCESS OF DESTRUCTIVELY DISTILLING BLACK LIQUOR
Filed Nov. 7, 1930
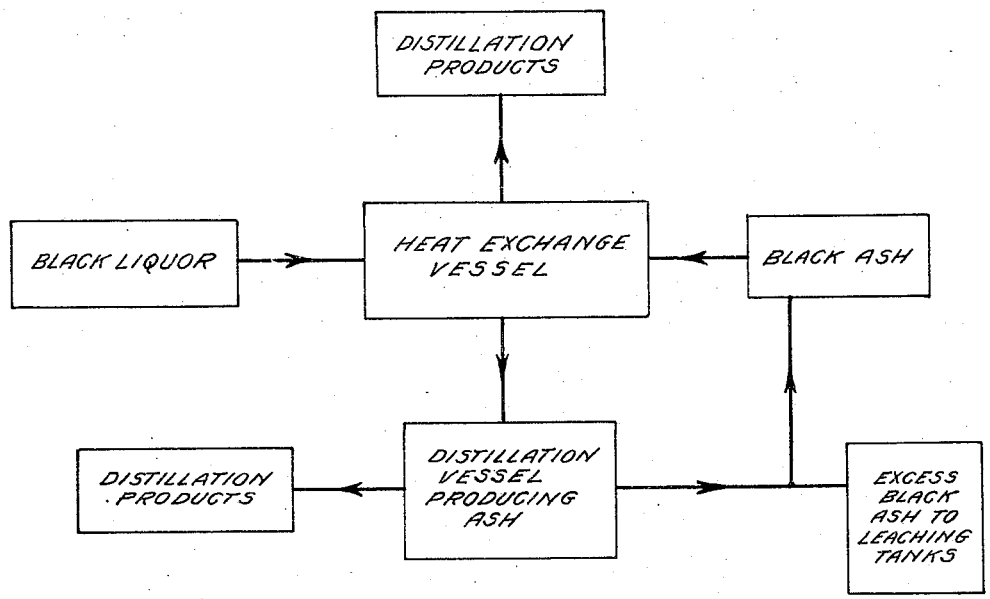
Inventor
RALPH W. KUMLER,
By Ellis S. Middleton
Attorney Patented Mar. 7, 1933

1,900,506

UNITED STATES PATENT OFFICE

RALPH W. KUMLER, OF WILMINGTON, DELAWARE

PROCESS OF DESTRUCTIVELY DISTILLING BLACK LIQUOR

Application filed November 7, 1930. Serial No. 494,005.

This invention relates to a method of treatment of liquid or semi-liquid materials of a viscous nature to facilitate handling thereof, by the efficient removal therefrom of contained moisture.

The general practice in mills, manufacturing cellulose pulp by the so-called soda and sulphate processes, is to separate the liquor resulting from the digestion of the wood, from the resultant pulp, and evaporate the former to a high concentration in a suitable type of multiple effect evaporators. As a result of this treatment, a liquid is obtained known as black liquor.

Black liquor when it comes from the evaporators contains about 50% water. It has been found heretofore that it is uneconomical to attempt to remove more of this moisture prior to introduction into the rotary incinerators, due to the fact that not only is this residual moisture most difficult to free from the contained solids, but the liquor in this state is very sticky and extremely hard to handle, particularly if much more water is removed.

Black liquor ordinarily contains about 50% of dry solids when concentrated to the point where it is received by the incinerators. While much of these solids consists of sodium salts, the exact nature of which depends upon the cooking process and the reagents used, these solids also contain many valuable products removed from the wood during the cooking treatment, which may be recovered through straight distillation or destructive distillation, such as alcohol, acetic acid, and many other valuable ligneous products. In the ordinary incinerating treatment, all of these products are lost, it being the purpose to recover only the metallic salts contained in the liquor by subsequent treatment.

Where the term "black liquor" is used in this specification and claims it is intended to cover the liquor obtained from the digestion of wood pulp, and where the term "black ash" is used it is intended to mean the residue resulting from the incineration, distillation or destructive distillation of black liquor.

The invention has particular application to the treatment of black liquor resulting from the digestion of wood pulp in the paper industry, and has for its principal object the treatment of such material as above set forth as an aid to the recovery of values therefrom.

This invention, therefore, contemplates first, the removal of the water in the black liquor in such a manner as will require no, or only minimum quantities, of extraneous or supplied heat and under such conditions that all of the volatile or distillation products may be subsequently recovered economically, due to the prior water removal. This initial drying treatment puts the black liquor into a physical form having a desired degree of dryness which facilitates handling and removes its objectionable sticky properties. The invention contemplate, secondly, the treatment of this dried material so as to recover and conserve all volatile or distillation products contained therein, in addition to the usual metallic salts, such as soda ash or the like.

To this end, the invention contemplates the mixing of black liquor with such a quantity of the hot black ash resulting from the incinerators or furnaces normally used in the soda or sulphate processes respectively, or resulting from the distillation or destructive distillation treatment of this invention, in a suitable vessel so that an efficient heat transfer will take place, the heat from the hot ash causing the evaporation of all or the major portion of the contained moisture in the liquor. This drying effect may reach any desired degree and may even go so far as to cause a partial distillation. After the initial drying treatment by mixing with hot black ash, distillation or destructive distillation of the dry or semi-dry product may be resorted to, to recover all of the volatile or distillation products, and the metallic salts subsequently, by methods already well-known. All of the above operations are performed as a cyclic process.

In the drawing, there is illustrated diagrammatically a flow sheet showing a process as contemplated by the invention.

Referring now to the drawing and a preferred procedure, black liquor from either the soda or sulphate processes may be taken from the usual evaporators, at a temperature of about 82° C. With two parts of black liquor at this temperature, I may mix in a suitable heat exchange vessel three parts of black ash resulting from the distillation and incineration step described hereinafter, the ash having a temperature of from 500° to 600° C. I have found that as a result, substantially two-thirds of the water contained in the black liquor is evaporated almost instantly. This leaves the mixture damp but not sticky. This mixture may then be readily conducted to a further drying vessel, as because of its physical condition at this point, no real difficulties to drying are presented. This further drying vessel may conveniently consist of an open kettle or pan heated by the hot gases from the incinerator, furnace or distillation vessel as the case may be. In this vessel, the drying operation may be continued without undue difficulty until a substantially dry product results. This resultant product may then be handled as any other dry product would be, and I have found it convenient to place the same in a distillation vessel for further treatment.

In the distillation vessel, extraneous heat is applied as desired and distillation or destructive distillation carried out to recover any volatile products in the mixture, in the usual manner. After the process has been carried in the distillation vessel to the point of forming an ash, usually about 500° C., and volatile values recovered, a portion of this ash is returned to the cycle and meets more on-coming black liquor in the heat exchange vessel. The excess black ash from the distillation vessel is suitably treated as desired for the recovery of the contained salts and/or carbon.

As an alternative procedure, and to eliminate the necessity of an additional drying step, I may mix two parts of black ash with one part of black liquor, which under the above temperature conditions, causes practically all of the water to be evaporated. Thus, by increasing the proportion of black ash to black liquor, the time of the cycle is materially reduced and the addition of extraneous drying heat made unnecessary.

I have found that when the dry or substantially dry mixture from the heat exchange vessel is delivered to the distillation vessel and heated to about 125° C., the mass becomes pasty and quite viscous. As the temperature is raised to about 250° C., the mass becomes stiffer and at a temperature near 260° C., it suddenly breaks down to a dry powder and remains so up to 500° C., which is the maximum temperature necessary to complete distillation. The distillation and destructive distillation products may be recovered in any desired fractions to insure efficient recoveries, and in any desired manner or apparatus.

As a result of carrying out this process, I find that black ash resulting from such distillation where the material in the distillation vessel reaches the temperature of 500° to 600° C., contains from 40% to 45% carbon and 55% to 60% metallic salts.

It is to be understood that while the preferred complete process contemplates the heat exchange step and the recovery of distillation products, yet the invention is not to be limited thereto. Obviously, the heat transfer step of mixing hot black ash with the relatively cooler black liquor to effect total or partial removal of water from the latter, is applicable to the ordinary processes where recovery of only the heavy salt content of the ash is desired. Such a drying step adds materially to the efficiency of the process in that it facilitates the handling of the liquor and tends to shorten the time necessary to convert the liquor to ash.

The heat exchange drying process has a particular advantage when applied to a complete method of value recovery including distillation products, for while it is possible to run black liquor into a retort without admixture and distill it, yet the retort would have to be periodically opened and the residue removed, and furthermore, the contained water in the liquor distilling over would dilute the distillate and would require subsequent treatment for its removal. In addition, it has been clearly demonstrated that when applying direct heat to black liquor, as the water evaporates, large bubbles form in the swelling, heavy, viscous liquid, making it extremely difficult to remove water therefrom and to heat sufficiently to distill other volatile substances. As a result, this increase in volume necessitates the use of large vessels or the treatment of small quantities of material. On the other hand, by mixing the black liquor and black ash, excessive swelling and bubbling is eliminated and a granular mixture is formed which may be stirred mechanically where desired and enables a continuous stream thereof to be treated so as to bring each particle into contact with a heating surface. This is particularly desirable as the thermal conductivity of black ash is very low and thick layers can not be heated successfully without agitation.

While the invention has been described with reference to the mixture of certain quantities of black liquor and black ash at certain specific temperatures, yet obviously I do not wish to be limited thereto as the amounts of the two substances to be mixed in heat transfer relation may be varied within wide limits, dependent upon their relative temperatures and the relative dryness desired in the mixture, so that the invention is to be construed broadly and restricted only by the scope of the claims.

I claim:

1. A process of treating black liquor, which includes the step of mixing black liquor with hot black ash to remove moisture from the black liquor.

2. A process for the recovery of values from black liquor, which includes the step of mixing black liquor with hot black ash to assist in the removal of moisture from the black liquor, heating the resultant mixture to drive off volatile values and recovering the same.

3. A process for the recovery of values from black liquor, which includes the step of mixing black liquor with hot black ash to assist in the removal of moisture from the black liquor, heating the resultant mixture to produce hot black ash, recovering the values from a portion of the black ash and returning a hot portion of the ash to on-coming black liquor, and repeating the cycle.

4. A process for the recovery of values from black liquor, which includes the step of mixing black liquor with hot black ash to remove a portion of the moisture from the black liquor, and removing the remaining moisture by directly applied heat.

5. A process for the recovery of values from black liquor, which includes the step of mixing black liquor with hot black ash to assist in the removal of moisture from the black liquor, and thereafter removing the volatile values from the substantially dried mixture by distillation.

6. A process for the recovery of values from black liquor, which includes the step of mixing black liquor with hot black ash to remove moisture from the black liquor, heating the mixture to drive off volatile values and to produce black ash, recovering the volatile values and thereafter recovering the values from the black ash.

7. A method of treating black liquor, which includes the step of mixing black liquor with a sufficient quantity of hot black ash to produce a substantially dry mixture without the necessity of applying extraneous heat.

8. A method of treating black liquor, which includes the step of mixing black liquor with a sufficient quantity of hot black ash to evaporate the major portion of the water in the liquor by heat transferred from the hot ash.

9. A method of removing moisture from black liquor, which includes the step of mixing one part by weight of black liquor with two parts by weight of hot black ash.

10. A process for removing moisture from black liquor, which includes the step of mixing two parts by weight of black liquor with three parts by weight of hot black ash.

11. A process for removing moisture from black liquor, which includes the step of mixing black liquor with a sufficient quantity of black ash at from 500° to 600° C. to evaporate the major portion of the water in the liquor by heat transferred from the hot ash.

12. A process for removing moisture from black liquor, which includes the step of mixing black liquor with a sufficient quantity of black ash at from 500° C. to 600° C. to evaporate the major portion of the water in the liquor by heat transferred from the hot ash, the black liquor being at substantially 82° C.

In testimony whereof, I have hereunto subscribed my name this 3rd day of November, 1930.

RALPH W. KUMLER.